United States Patent [19]

Yamada et al.

[11] Patent Number: 4,484,051
[45] Date of Patent: Nov. 20, 1984

[54] BREAKTHROUGH DETECTION MEANS FOR ELECTRIC DISCHARGE MACHINING APPARATUS

[75] Inventors: Shigeo Yamada; Tamio Takawashi; Toshimitsu Sakakibara, all of Aichi, Japan

[73] Assignee: Mitsubishi Denki Kabushiki Kaisha, Tokyo, Japan

[21] Appl. No.: 347,387

[22] Filed: Feb. 9, 1982

[30] Foreign Application Priority Data

| Feb. 13, 1981 [JP] | Japan | 56-19712 |
| Feb. 13, 1981 [JP] | Japan | 56-19713 |
| Feb. 13, 1981 [JP] | Japan | 56-19714 |
| Feb. 13, 1981 [JP] | Japan | 56-19715 |
| Feb. 13, 1981 [JP] | Japan | 56-19716 |
| Feb. 13, 1981 [JP] | Japan | 56-19717 |

[51] Int. Cl.³ .................................................. B23P 1/02
[52] U.S. Cl. ................................ 219/69 C; 219/69 G; 219/69 S
[58] Field of Search ................ 219/69 C, 69 G, 69 M, 219/69 S; 204/129.25, 129.5, 129.55, 225

[56] References Cited

U.S. PATENT DOCUMENTS

| 3,609,279 | 9/1971 | Giesbrecht | 219/69 G |
| 3,659,070 | 4/1972 | Ioffe et al. | 219/69 E |
| 3,748,427 | 7/1973 | Baldwin | 219/69 E |
| 4,107,504 | 8/1978 | Dinsdale | 219/69 E |
| 4,146,770 | 3/1979 | Dinsdale et al. | 219/69 M |
| 4,229,635 | 10/1980 | Dinsdale | 219/69 G |

*Primary Examiner*—C. L. Albritton
*Assistant Examiner*—Alfred S. Keve
*Attorney, Agent, or Firm*—Sughrue, Mion, Zinn, Macpeak & Seas

[57] ABSTRACT

An EDM machining apparatus is provided with means for automatic shut off upon completion of a machining process, including a voltage variation pattern detector capable of discriminating electrode penetration of the workpiece. Several other machining parameters, such as machining solution flow and pressure, machining depth, and electrode speed and direction may be used is secondary or confirmation detection factors, so as to positively detect the time of electrode penetration, and halt the machining process.

10 Claims, 21 Drawing Figures

FIG. 3

| DETECTION FACTOR | MACHINING CONDITION | | | |
| --- | --- | --- | --- | --- |
| | IDLING | MACHINING | SHORT-CIRCUITING | PENETRATING |
| SERVO VOLT. VARIATION PATTERN | (+6v) | (+6)→(+3~-3) | (+3~-3)→(-6)→(+6) | (+3~-3)→(+6) |
| OUTPUT SIGNAL H / L | | | | |

FIG. 6

| DETECTION FACTOR | | MACHINING CONDITION | | | |
|---|---|---|---|---|---|
| | | IDLING | MACHINING | SHORT-CIRCUITING | PENETRATING |
| SERVO VOLT. VARIATION PATTERN | | (+6v) | (+6)→(+3~-3) | (+3~-3)→(-6)→(+6) | (+3~-3)→(+6) |
| OUTPUT SIGNAL | H | | | | |
| | L | | | | |
| DEEPEST MACHINING | | DEEPEST MACHINING | DEEPEST MACHINING | NON-DEEPEST MACHINING | DEEPEST MACHINING |
| OUTPUT SIGNAL | H | | | | |
| | L | | | | |

FIG. 8

| DETECTION FACTOR | MACHINING CONDITION | | | |
|---|---|---|---|---|
| | IDLING | MACHINING | SHORT-CIRCUITING | PENETRATING |
| SERVO VOLT. VARIATION PATTERN | (+6v) | (+6)→(+3~-3) | (+3~-3)→(-6)→(+6) | (+3~-3)→(+6) |
| OUTPUT SIGNAL H / L | | | | |
| ELECTRODE MOVEMENT SPEED | HIGH (IDLING SPEED) | LOW (MACHINING SPEED) | HIGH (IDLING SPEED) | HIGH (IDLING SPEED) |
| OUTPUT SIGNAL H / L | | | | |

FIG. 11

| DETECTION FACTOR | | MACHINING CONDITION | | | |
|---|---|---|---|---|---|
| | | IDLING | MACHINING | SHORT-CIRCUITING | PENETRATING |
| SERVO VOLT. VARIATION PATTERN | | (+6v) | (+6)→(+3~-3) | (+3~-3)→(-6)→(+6) | (+3~-3)→(+6) |
| OUTPUT SIGNAL | H | | | | |
| | L | | | | |
| MACHINING SOLUTION PRESSURE | | SETTING | SET PRESSURE | LOWERING | LOWERING |
| OUTPUT SIGNAL | H | | | | |
| | L | | | | |

FIG. 14

| DETECTION FACTOR | | MACHINING CONDITION | | | |
|---|---|---|---|---|---|
| | | IDLING | MACHINING | SHORT-CIRCUITING | PENETRATING |
| SERVO VOLT. VARIATION PATTERN | | (+6v) | (+6)→(+3~-3) | (+3~-3)→(-6)→(+6) | (+3~-3)→(+6) |
| OUTPUT SIGNAL | H | | | | |
| | L | | | | |
| MACHINING SOLUTION FLOW | | SETTING | SET FLOW | FLOW INCREASING | FLOW INCREASING |
| OUTPUT SIGNAL | H | | | | |
| | L | | | | |

FIG. 16

| DETECTION FACTOR | | MACHINING CONDITION | | | |
|---|---|---|---|---|---|
| | | IDLING | MACHINING | SHORT-CIRCUITING | PENE-TRATING |
| SERVO VOLT. VARIATION PATTERN | | (+6v) | (+6)→(+3~−3) | (+3~−3)→(−6)↑(+6) | (+3~−3)→(+6) |
| OUTPUT SIGNAL | H | | | | |
| | L | | | | |
| ELECTRODE MOVEMENT DIRECTION | | DOWN | DOWN | DOWN→UP | DOWN |
| OUTPUT SIGNAL | H | | | | |
| | L | | | | |

FIG. 19A

| | | MACHINING CONDITION | | | |
|---|---|---|---|---|---|
| | DETECTION FACTOR | IDLING | MACHINING | SHORT-CIRCUITING | PENETRATING |
| PRIMARY DETECTION FACTOR | SERVO VOLT. VARIATION PATTERN | (+6v) | (+6)→(+3~-3) | (+3~-3)→(-6)→(+6) | (+3~-3)→(+6) |
| | OUTPUT SIGNAL H L | DEEPEST MACHINING | DEEPEST MACHINING | | DEEPEST MACHINING |
| AUXILIARY DETECTION FACTOR | DEEPEST MACHINING OUTPUT SIGNAL H L | HIGH (IDLING SPEED) | LOW (MACHINING SPEED) | NON-DEEPEST MACHINING | |
| | ELECTRODE MOVEMENT SPEED OUTPUT SIGNAL H L | | | HIGH (IDLING SPEED) | HIGH (IDLING SPEED) |

FIG. 19B

| | | MACHINING CONDITION | | | |
|---|---|---|---|---|---|
| DETECTION FACTOR | IDLING | MACHINING | SHORT-CIRCUITING | PENE-TRATING |
| ELECTRODE MOVEMENT DIRECTION | DOWN | DOWN | DOWN→UP | DOWN |
| OUTPUT SIGNAL H / L | | | | |
| MACHINING SOLUTION FLOW | SETTING | SET FLOW | FLOW INCREASING | FLOW INCREASING |
| OUTPUT SIGNAL H / L | | | | |
| MACHINING SOLUTION PRESSURE | SETTING | SET PRESSURE | LOWERING | LOWERING |
| OUTPUT SIGNAL H / L | | | | |
| AUXILIARY DETECTION FACTOR | | | | |

BREAKTHROUGH DETECTION MEANS FOR ELECTRIC DISCHARGE MACHINING APPARATUS

BACKGROUND OF THE INVENTION

This invention relates to electric discharge machining apparatuses, and more particularly to an electric discharge machining apparatus for forming a through-hole in a workpiece, in which, when the electrode penetrates the workpiece, the machining operation is automatically ended.

In an electric discharge machining operation, an electrode confronts a workpiece to be machined, with a gap therebetween, and electric discharge is caused to take place in the gap while a machining solution is being supplied to the gap, to machine the workpiece as required. If an electric discharge machining apparatus is used to bore a hole in a workpiece, a trimming die having a desired configuration, for example, can be formed with high accuracy. Therefore, this machining method is suitable for forming various metal and other molds. However, the conventional method of forming a hole in a workpiece with an electric discharge machining apparatus is disadvantageous in the following points: The time instant when the end of the electrode penetrates the workpiece cannot be automatically detected. Accordingly, although the hole has been formed in the workpiece, the electrode is further fed to continue the electric discharge machining operation. As a result, the machining time is increased by as much, and the side of the trimming die is excessively machined, i.e., machining accuracy is considerably lowered. Furthermore, heretofore, in order to detect the penetration of the electrode, the amount of feed of the electrode has merely been estimated, or the operator has been required to watch the movement of the electrode, during the machining operation.

FIG. 1 illustrates a conventional electric discharge machining apparatus. An electrode 10 and a workpiece 12 confront each other with a gap therebetween in a machining solution contained in a machining tank 14. A gap voltage sometimes referred to herein as a servo voltage is applied across the gap by a power source unit 16. The gap voltage is adjusted according to a detection value of a gap voltage detecting unit 18, so that electric discharge machining is carried out under the condition that the gap is maintained constant. The machining solution is supplied from a machining solution circulating unit 20 into the machining tank 14 by a machining solution supplying pump 22. In this operation, the pressure of the machining solution is controlled according to a pressure value which is detected by a machining solution pressure gauge 24. In the conventional electric discharge machining apparatus thus constructed, while the gap between the electrode 10 and the workpiece 12 is maintained unchanged, the electrode 10 is moved in the machining direction (downwardly in FIG. 1), so that a recess or a through-hole is formed in the workpiece 12 by the electric discharge which occurs in the gap.

With the conventional apparatus as described above, after the electrode 10 has penetrated the workpiece 12, the electrode 10 is further moved in the machining direction (or downwardly in FIG. 1). Accordingly, it is necessary for the operator to watch the position of the electrode 10 relative to the workpiece 12 at all times; that is, it is necessary for him to control the speed of movement of the electrode 10 with a dial gauge (not shown) or the like, so that the electrode 10 is stopped simultaneously when the workpiece has been machined. This operation is undoubtedly troublesome. On the other hand, in the case where the amount of consumption of the electrode 10 (or the amount of movement of the electrode 10) is approximately known in advance, heretofore a method has been employed where a dial gauge operated in association with the movement of the electrode 10 is used in combination with a limit switch, so that when the electrode 10 has been moved by the amount set in advance, the machining operation is automatically ended.

As described above, with the conventional electric discharge machining apparatus, the operator must watch the position of the electrode 10 relative to the workpiece 12 at all times, so as to detect when the electrode 10 penetrates the workpiece 12 to thereby end the machining operation. Thus, the machining operation is tedious and troublesome, and it is difficult to maintain the amount of feed of the electrode 10 constant. Furthermore, the conventional electric discharge machining apparatus is disadvantageous in that, in the case where a through-hole is formed in the workpiece with a thin electrode, the electrode is vibrated depending on the amount of feed of the electrode after it has penetrated the workpiece; that is, it is not moved straightly after penetrating the workpiece, as a result of which the configuration of the hole thus formed is adversely affected.

In the case where the amount of consumption (or the amount of movement) of the electrode 10 is known in advance as described above, the machining operation can be ended automatically to some extent by using a dial gauge operating in association with the movement of the electrode, and a limit switch (not shown). However, under the electrical conditions in an ordinary hole forming operation, the electrode 10 is greatly consumed, and therefore it is difficult to determine the amount of consumption (or movement) of the electrode 10 in advance.

As described above, in order to detect when the electrode has penetrated the workpiece to thereby end the machining operation, the operator must carry out troublesome work, which lowers work efficiency and makes it difficult to provide an automatic electric discharge machine.

SUMMARY OF THE INVENTION

In view of the above-described difficulties accompanying the conventional electric discharge machining apparatus, an object of the invention is to provide an electric discharge machining apparatus in which the time instant when the end of an electrode 10 penetrates the workpiece 12 is detected to automatically end the machining operation.

The foregoing object and other objects of the invention have been achieved by providing an electric discharge machining apparatus in which an electrode confronts a workpiece with a gap therebetween, and an electric discharge is caused to occur in the gap to thereby machine the workpiece; which machine, according to the invention, comprises: a gap voltage detecting unit for detecting a gap voltage variation pattern which is applied to a power supply unit adapted to apply a predetermined machining voltage across said electrode and workpiece; and a gap voltage variation pattern judging circuit for comparing a gap voltage variation pattern from said servo voltage detecting unit with a number of gap voltage variation patterns which are stored in said gap voltage variation pattern judging circuit in advance, during the machining operation, a time instant when an end of said electrode penetrates said workpiece being detected from the corresponding gap voltage variation pattern so that the machining operation may be ended. In combination with the foregoing, numerous other detection factors may be used as an aid in discriminating electrode penetration, such as the electrode movement speed and/or direction, the machining solution pressure and/or flow rate, and the machining depth, particularly the largest machining depth.

BRIEF DESCRIPTION OF THE DRAWINGS

FIG. 3 is an explanatory diagram indicating output signals from which various operating conditions are detected;

FIG. 6 is a table for explaining various output signals during the several operating phases;

FIG. 8 is a chart explaining output signals derived from a third embodiment of the invention;

FIG. 11 explains the various output signals of the arrangement of FIG. 10;

FIG. 14 explains the output signals during several stages of the machining process;

FIG. 16 shows the various output signals obtained in a still further embodiment of the invention;

FIGS. 19A and 19B are charts explaining various output signals obtained with the FIG. 18 embodiment.

DETAILED DESCRIPTION OF THE PREFERRED EMBODIMENTS

Several embodiments of the invention will be described with reference to the accompanying drawings.

Figure 1:
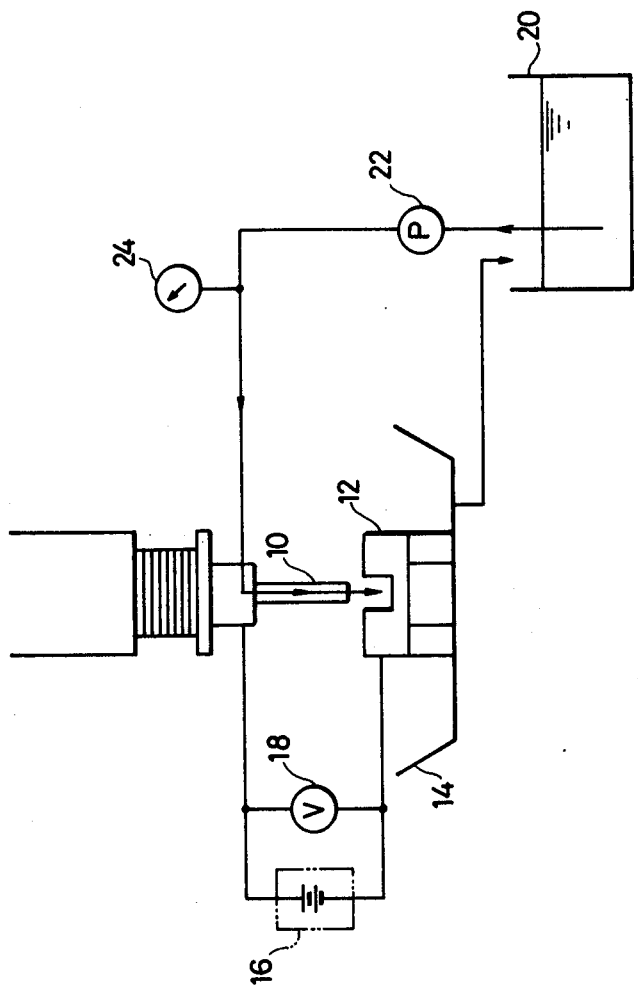
FIG. 1 is an explanatory diagram illustrating a conventional electric discharge machining apparatus.
Figure 2:
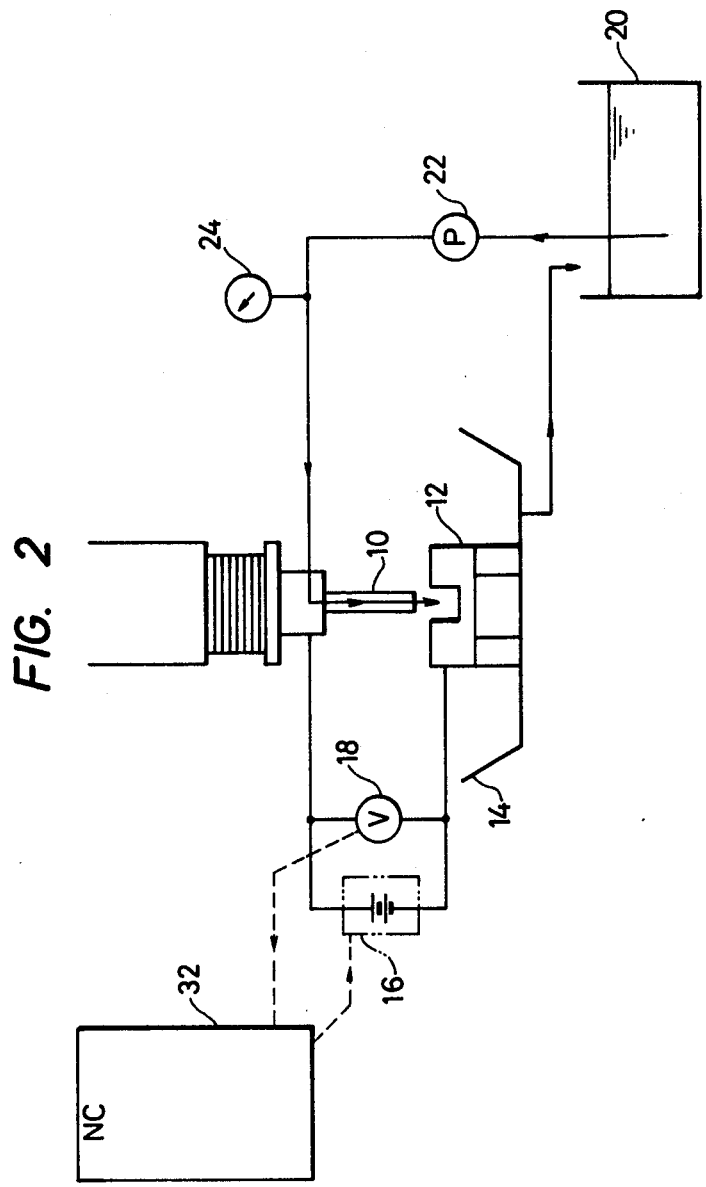
FIG. 2 is an explanatory diagram showing an electric discharge machining apparatus according to a first embodiment of the invention.

FIG. 2 illustrates a first electric discharge machining apparatus according to the invention. In FIG. 2, those components previously described with reference to FIG. 1, which shows the conventional discharge machine, are similarly numbered, and thus a detailed description thereof will be omitted.

The present invention has been developed from the fact that, when various machining conditions are electrically detected during the machining operation, these machining conditions exhibit special characteristics when the electrode penetrates the workpiece, and therefore the penetration of the electrode can be automatically detected from these characteristics. In the invention, for this purpose, the gap voltage variation pattern, either alone or in combination with other detection factors, is selected.

Figure 4:
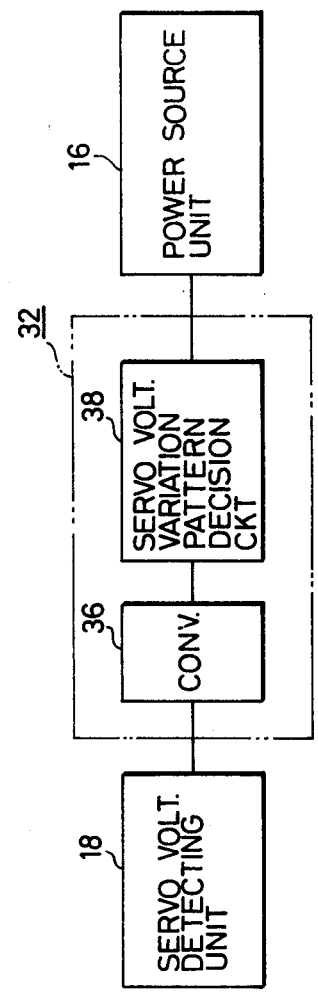
FIG. 4 is a circuit diagram illustrating a circuit for detecting when the electrode penetrates the workpiece for use with the construction of FIG. 2.

As described above, the penetration of the electrode may be detected from the gap voltage variation pattern. In order to electrically detect the gap voltage variation, a gap voltage detecting unit 18, a converter 36 and a gap voltage variation pattern judging circuit 38 are provided as shown in FIG. 4. The servo voltage variation patterns covering various operating conditions (idling, machining, short-circuiting and penetrating conditions), and the corresponding output signals are as indicated in FIG. 3. In this embodiment, the output signals are indicated by two kinds of signals, i.e., a high level signal "H" and a low level signal "L".

The gap voltage detecting unit 18 detects an average voltage across the gap, which is the gap voltage. The gap voltage thus detected is subjected to a desired conversion in the converter 36 and is then applied to the gap voltage variation pattern judging circuit 38. A number of gap voltage variation patterns have been stored in the circuit 38. Therefore, in the circuit 38, the actual gap voltage variation pattern is compared with the gap voltage variation patterns thus stored, and a high "H" or low "L" level signal corresponding thereto is outputted. The output signals corresponding to the gap voltage variation patterns in the various operating conditions will now be described.

In the idling condition in which the electrode 10 approaches the machining position of the workpiece 12 before machining is carried out, the electrode 10 is spaced apart from the workpiece 12, and accordingly the gap voltage variation pattern indicates (+6 V), higher than that (+3 V to −3 V) during the ordinary machining condition. In this case, the output signal is at "H".

When the electrode 10 nears the workpiece 12 to define the gap therebetween in which electric discharge can occur, the electric discharge machining operation starts. In this case, the servo voltage variation pattern is changed from (+6 V) to (+3 V to −3 V) and the output signal level is changed from "H" to "L". During the typical machining operation in which, for instance, the electrode 10 is moved up and down, the servo voltage variation pattern is maintained in the range of (+3 V to −3 V), and the output signal is thus maintained at "L".

In the short-circuiting condition in which the electrode 10 is abnormally brought in contact with the workpiece 12, the servo voltage variation pattern is changed from (+3 V to −3 V) to (−6 V). In response to this change, a short-circuit avoidance circuit (not shown) is operated to move the electrode upwardly to eliminate the short-circuit condition. Thereupon, the gap voltage variation pattern is changed to (+6 V) from (−6 V). Thereafter, the electrode 10 is moved downwardly again so that the ordinary machining condition is obtained. During the short-circuiting condition as described above, the output signal is maintained at "L".

When the machining operation comes to the end, the electrode 10 penetrates the workpiece 12 and is further moved downwardly. The gap voltage variation pattern is then changed to (+6 V) from (+3 V to −3 V), and the output signal level is raised to "H".

The gap voltage variation patterns in the various operating conditions (idling, machining, short-circuiting and penetrating conditions) and the corresponding output signals are as described above. Thus, the penetration of the electrode can be electrically detected from the output signal characteristic thereof in the above-described gap voltage variation pattern. More specifically, when the electrode penetrates the workpiece, the output signal level is changed from "L" to "H". This output signal variation pattern is not obtained in the other operating conditions, namely, the idling, machining and short-circuiting conditions. Therefore, the time of electrode penetration can be positively detected from the signal variation pattern.

The operation of a power supply unit 16 utilizing the gap voltage variation patterns will now be described.

The power supply unit 16 continues the supply of electric power when the output signal of the gap voltage variation pattern judging circuit 38 is at "L" (i.e., in the machining or short-circuiting condition), but it suspends the supply of electric power to end the machining operation when the output signal of the circuit 38 is at "H" (or when the electrode penetrates the workpiece). In the idling condition, the output signal of the circuit 38 is also at "H"; however, it should be noted that the circuit 38 is so designed that, in the idling condition, the output signal is not applied to the power supply unit 16, so that the supply of power is continued, as discussed in more detail hereafter.

As is apparent from the above-description, in the electric discharge machining apparatus according to the invention, the time instant when the end of the electrode 10 penetrates the workpiece 12 is detected so that the machining operation is automatically stopped.

In the case of FIG. 4, the converter 36 and the gap voltage variation pattern judging circuit 38 are shown included in a numerical control unit 32; however, they may be separated from the numerical control unit 32, i.e., they may be provided individually.

If, when the penetration of the electrode is detected, the electrode 10 is further moved a predetermined distance in the machining direction (or downwardly in FIG. 2) before the machining operation is ended, then an adverse effect due to the consumption of the electrode can be eliminated. In particular, in the electric discharge machining operation, as the workpiece is machined, the end portion of the electrode 10 is consumed and becomes thin. Therefore, if the machining operation is ended immediately upon the end of the electrode 10 penetrating the workpiece 12, then the size of the through-hole formed in the workpiece 12 will be smaller than that desired. Therefore, in this embodiment of the invention, the electrode 10 is allowed to move until the portion thereof, the dimensions of which are constant, penetrates the workpiece, so that a through-hole correct in its end dimension is obtained at all times.

During the idling condition of the electrode 10 before electric discharge occurs, as shown in FIG. 3, the output signal is at "H" similarly as in the case of electrode penetration. In order to inhibit the application of this output signal to the power supply unit 16, the gap voltage variation pattern judging circuit 38 may be so designed that it is not placed in an operating state immediately when the machining start switch is turned on, but rather so that it is placed in an operating state when machining is started, i.e., when a gap voltage of less than 3 V, an average machining current of larger than 1A or an average machining voltage of lower than 60 V is detected (i.e., when electric discharge occurs). In this case, the possibility of an erroneous shut-down during the idling condition is eliminated, and accordingly the arrangement of the electric discharge machine is simplified by as much.

In the electric discharge machining apparatus of the invention, the gap voltage variation pattern can be detected as described above, and used to discriminate electrode penetration. However, the gap voltage variation pattern is somewhat unstable. Especially during the short-circuiting condition, and also during machining, the voltage may fluctuate and thus the output "stop" signal may be erroneously provided. Thus, in this case, the detection from the gap voltage variation pattern alone may be erroneous. In order to overcome this difficulty, in the electric discharge machining apparatus of the invention, the short-circuiting condition and the penetrating condition may be discriminated from each other according to a second, independent factor.

Figure 5:
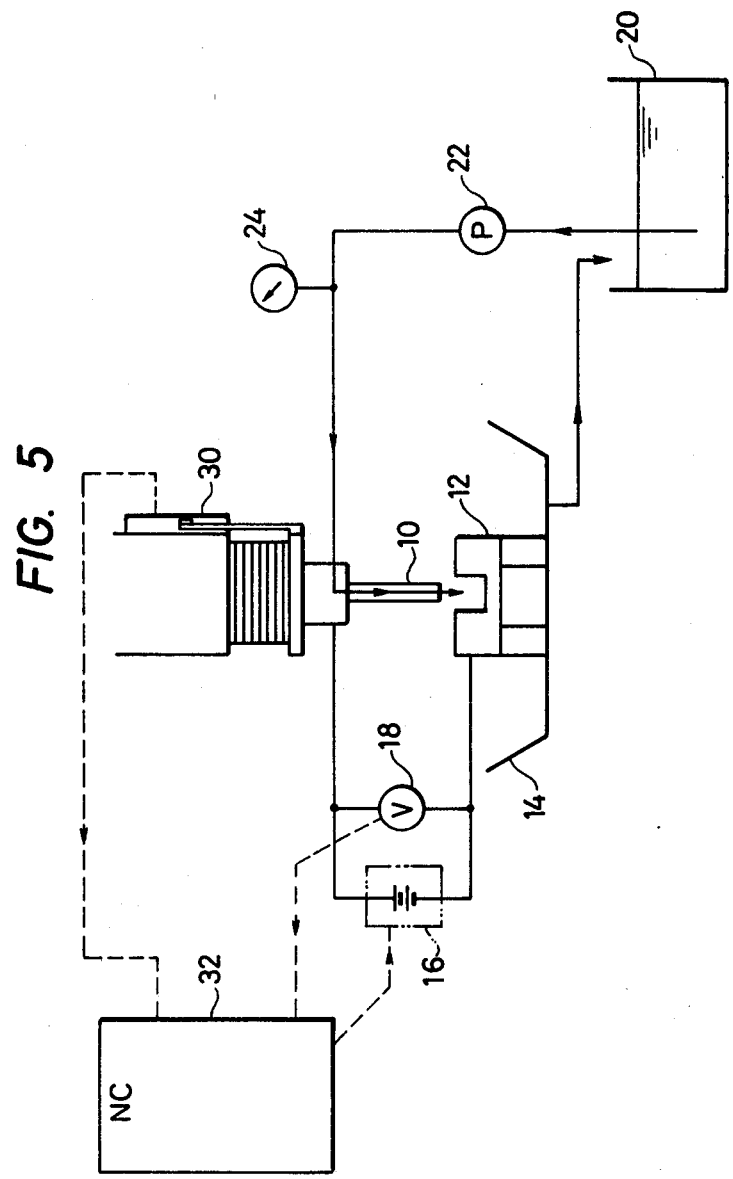
FIG. 5 illustrates a second embodiment of the invention wherein additional penetration detection means has been added.
Figure 7:
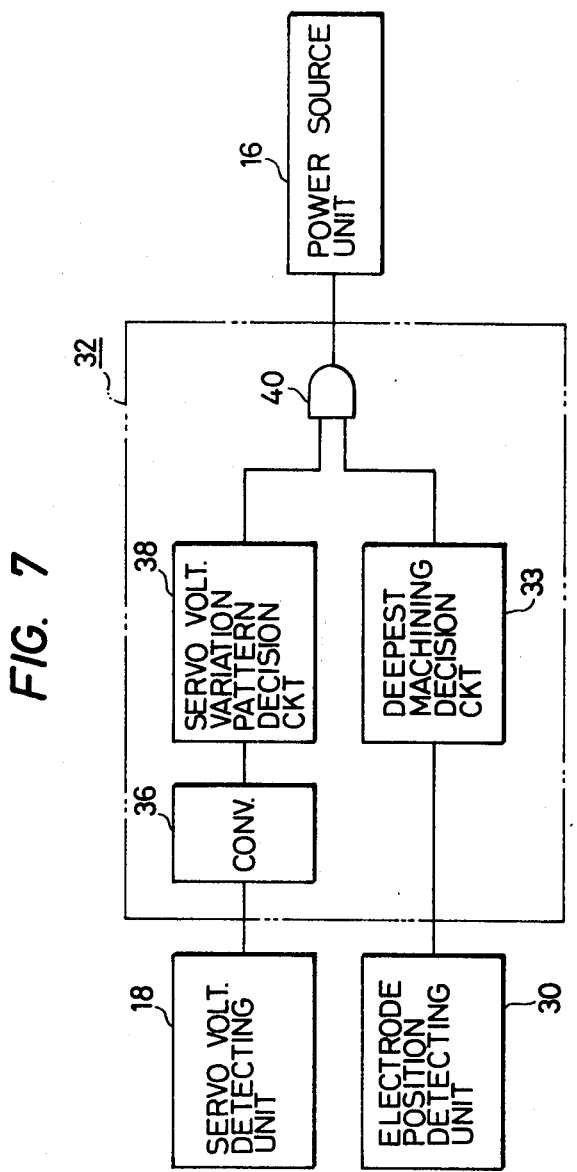
FIG. 7 is a circuit diagram illustrating a circuit for use with the arrangement of FIG. 5.

In the invention, one second factor for detecting when the electrode penetrates the workpiece is an increasing machining depth. In order to detect whether or not a given machining operation is the "deepest", an electrode position detecting unit 30 and a machining depth decision circuit 33 are provided as shown in FIGS. 5 and 7. The term "deepest" as used herein is intended to indicate that the electrode 10 carries out machining of the greatest depth thus far attained. Since the electrode 10 is slightly vibrated vertically during the machining operation, the electrode does not constantly exceed the previous maximum depth during a relatively short period. However, this machining is also regarded as the "deepest".

In the various operating conditions (e.g., the idling, machining, short-circuiting and penetrating conditions), the relative machining depth and the corresponding output signals are as shown in FIG. 6.

In this embodiment, according to whether or not the machining is carried out at the then largest depth, an output signal at a high or low logic level (hereinafter referred to merely as "H" or "L", respectively, when applicable) is provided.

In this embodiment, the electrode position is utilized to detect whether or not greatest-depth machining is carried out. The electrode position detecting unit 30 detects the position of the electrode 10 to output a position signal which is applied to the machining depth decision circuit 33. In the circuit 33, the position signal is processed to determine whether the present machining operation "deepest" thus far. The circuit 33 operates to output a signal at "H" if the present machining operation is the deepest, and a signal at "L" if not. Now, the output signal which is provided in each operating condition will be described.

In the idling condition, the electrode 10 is moved downwardly and therefore it carries out the "deepest machining", although no "machining" actually takes place. Therefor, in the idling condition, the output signal is maintained at "H".

In the machining condition, the electrode 10 is moved downwardly while vibrating vertically, and therefore the machining depth continuously increases. In the machining condition, the output signal is thus also maintained at "H".

In the short-circuit condition, the electrode 10 is abnormally brought into contact with the workpiece 12. In order to eliminate the short-circuiting condition, the electrode 10 is moved upwardly, after which it is moved downwardly again. In the short-circuit condition, the electrode 10 does not carry out machining at the greatest depth, as it is retracted upwardly from the position where it was brought into contact with the workpiece. Therefore, the output signal level is changed to "L", and it is maintained at "L" during the above-described operation.

Upon penetration, the electrode penetrates the workpiece 12, and is moved further downwardly; that is, the electrode carries out greatest-depth machining. In the penetrating condition, the output signal is thus maintained at "H".

As described above, in the short-circuiting condition, the output signal is at "L" because of the upward and then downward movement of the electrode, while in the penetrating condition the output signal is at "H" similarly as in the machining and idling conditions. Therefore, the short-circuiting condition can be readily distinguished from the penetrating condition according to the machining depth factor.

The output signal of the gap voltage variation pattern decision circuit 38 and the output signal of the greatest machining depth decision circuit 33 are applied to an AND circuit 40. Only when both the output signals are at "H", does the AND circuit 40 apply a stop signal to the power supply unit 16 to suspend the application of power to stop the machining operation. Now, the operation of the AND circuit 40 in the various operating conditions will be described.

In the idling condition, the output signal of the gap voltage variation pattern decision circuit 38 and the output signal of the deepest machining decision circuit 33 are both at "H". However, the present electric discharge machining apparatus is designed so that, as described before, in the idling condition, the AND gate 40 can provide no stop signal to the power supply unit 16.

In the machining condition, the output signal of the gap voltage variation pattern decision circuit 38 is at "L" and that of the machining depth decision circuit 33 is at "H". Therefore, the AND circuit 40 outputs no stop signal.

In the short-circuiting condition, the output signal of the gap voltage variation pattern decision circuit 38 and the output signal of the machining depth circuit 33 are both at "L". Therefore, the AND circuit 40 outputs no stop signal.

In the penetrating condition, since the output signal of the gap voltage variation pattern decision circuit 38 and the output signal of the machining depth decision circuit 33 are both at "H", and AND circuit 40 will apply the stop signal to the power supply unit 16, so that the application of power is suspended to stop the machining operation.

In this embodiment, the converter 36, the gap voltage variation pattern decision circuit 38, the machining depth decision circuit 33, and the AND gate 40 are shown included in a numerical control unit 32; however, they may be separated from the numerical control unit 32, i.e., they may be provided individually.

As an alternative to the foregoing embodiment, the penetration condition may also be discriminated by using different independent detection factors other than the machining depth, together with the variation pattern.

In particular, a further factor for detecting the penetration of the electrode in the invention is the electrode movement speed. In order to electrically detect the electrode movement speed, the electrode position detecting unit 30 and an electrode movement speed decision circuit 35 are provided as shown in FIG. 9.

The electrode movement speeds and the corresponding output signals in the various operating conditions are as indicated in FIG. 8.

In this embodiment, the two output signals "H" and "L" are provided according to the electrode movement speed (high vs. low speed), respectively.

Figure 9:
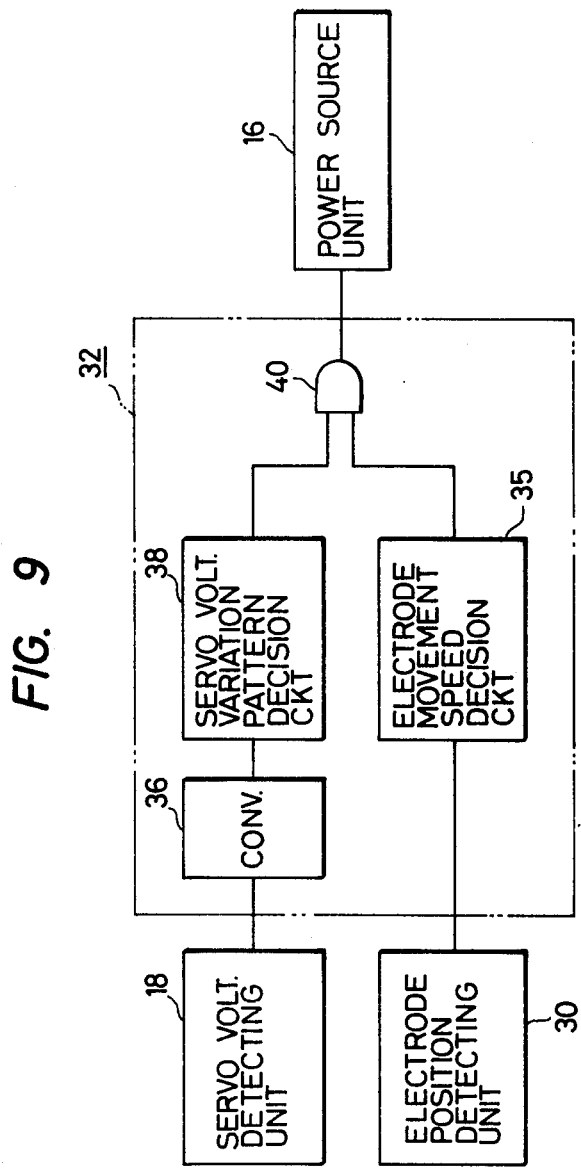
FIG. 9 is a circuit diagram for a circuit used with the third embodiment of the invention.

In FIG. 9, the electrode position is utilized to detect the electrode movement speed. The electrode position detecting unit 30 detects the position of the electrode 10 to output a position signal which is applied to an electrode movement speed decision circuit 35, where the position signal is processed to determine when the electrode movement speed is high, e.g. above a predetermined speed, and when the speed is low. Now, the output signals which are provided in response to the electrode speeds in the various operating conditions will be described.

In the idling condition, the gap between the electrode 10 and the workpiece 12 is large, and therefore the electrode is moved downwardly at high speed. Thus, in the idling condition, the output signal is at "H".

During the machining operation, the electrode 10 is moved downwardly at low speed while performing electric discharge machining. Thus, during the machining operation, the output signal is maintained at "L".

In the short-circuit condition, the electrode 10 comes in contact with the workpiece 12. In order to eliminate the short-circuit condition, the electrode is retracted upwardly at high speed and it then again moved downwardly, at high speed. Thus, during the short-circuit condition, the output signal is maintained at "H".

In the penetrating condition, the electrode 10 penetrates the workpiece, and is then further moved downwardly at high speed. Thus, in the penetrating condition, the output signal is at "H".

The electrode movement speeds and the corresponding output signals in the various operating conditions are as described above. In the machining condition, the output signal is at "L" because of the low speed whereas in the penetrating condition, the output signal is at "H", similarly as in the idling and short-circuiting conditions. Thus, the penetrating condition can be readily distinguished from the machining condition according to the electrode movement speed factor.

The output signal of the gap voltage variation pattern decision circuit 38 and that of the electrode movement speed decision circuit 35 are applied to an AND circuit 40. Only when both the output signals are at "H", will the AND circuit 40 apply a stop signal to the power supply unit 16 to stop the machining operation.

In the idling condition, the output signal of the gap voltage variation pattern decision circuit 38 and the output signal of the electrode movement speed decision circuit 35 are both at "H". However, the present electric discharge machining apparatus is designed so that, as described previously, in the idling condition, the AND gate 40 can provide no stop signal to the power supply unit 16.

In the machining condition, the output signal of the gap voltage variation pattern decision circuit 38 and the output signal of the electrode movement speed decision circuit 35 are both at "L", and accordingly, the AND circuit 40 outputs no stop signal.

In the short-circuit condition, the output signal of the gap voltage variation pattern decision circuit 38 is at "L" and decision circuit 35 is at "H". Therefore no stop signal is produced.

In the penetrating condition, since the output signal of the circuit 38 and that of the circuit 35 are both at "H", the AND circuit 40 applies the stop signal to the power supply unit 16 so that the application of power is suspended, to thereby stop the machining operation.

In this embodiment, the converter 36, the servo variation decision circuit 38, the electrode movement speed decision circuit 35 and the AND gate 40 may be separated from the numerical control unit 32 and provided individually, as before.

According to a further embodiment of the present invention, the machining condition and the penetrating condition are discriminated from each other according to another separate factor, combined with and distinct from the gap voltage variation pattern.

Figure 10:
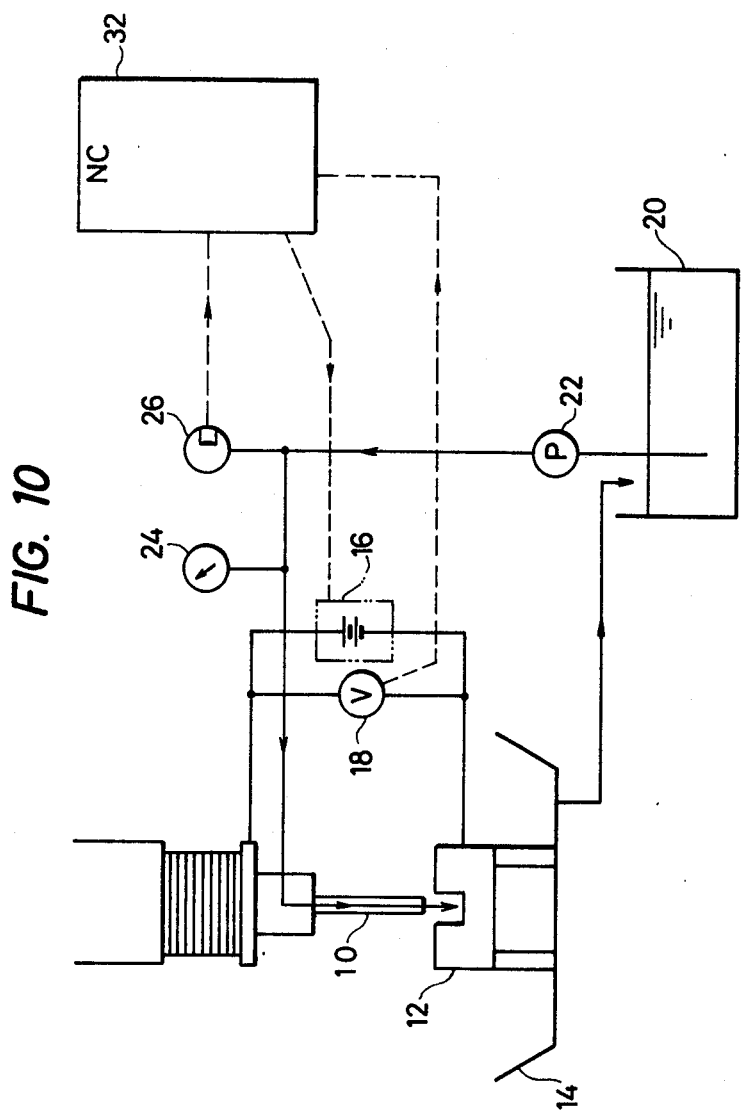
FIG. 10 illustrates the arrangement of a fourth embodiment of the invention, using pressure as a parameter.
Figure 12:
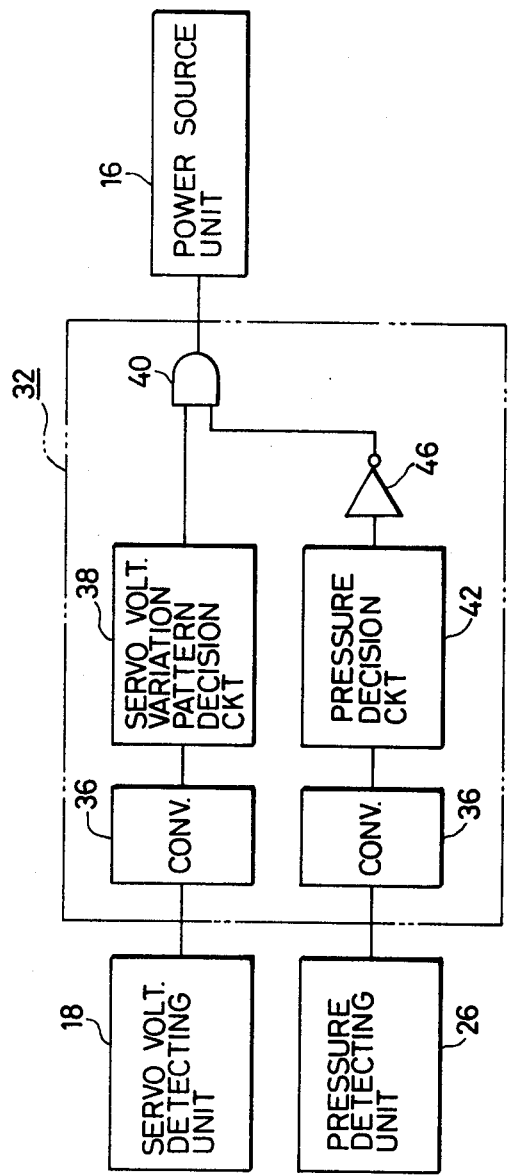
FIG. 12 illustrates a circuit for use with the FIG. 10 embodiment.

This additional factor for use in detecting the penetration of the electrode is the machining solution pressure. In order to electrically detect the machining solution pressure, a machining solution pressure detecting unit 26, a converter 36, a machining solution pressure decision circuit 42 and an inverter 46 are provided as shown in FIGS. 10 and 12. The machining solution pressure and the corresponding output signals in the various operating conditions are as indicated in FIG. 11.

In this embodiment, the two output signals "H" and "L" are provided according to the value of the machining solution pressure, respectively. The machining solution pressure detecting unit 26 detects the pressure of the machining solution supplied. The pressure thus detected is subjected to a predetermined conversion in the converter 36 and is then applied to the machining solution pressure decision circuit 42, where the pressure of the machining solution is discriminated. If the pressure is at a set pressure, the circuit 42 outputs an "H" signal, while if it is lower than the set pressure, the circuit 42 outputs an "L" signal. The output signal from the machining solution pressure decision circuit 42 is supplied to an inverter 46 to be inverted. The output signal of the inverter 46 in the various operating conditions will now be described.

In the idling condition, the pressure of the machining solution is being adjusted to the set pressure; that is, it is adjusted to the set pressure before the machining is begun. Therefore the machining solution pressure decision circuit provides no output signal during idling.

In the machining condition, the machining solution is supplied into the gap between the electrode 10 and the workpiece 12, the pressure of the machining solution being equal to the set pressure. Therefore, the machining solution pressure decision circuit 42 outputs the "H" signal. Thus, in the machining condition, the inverter 46 outputs the "L" signal continuously.

In the short-circuit condition, the electrode 10 is brought into contact with the workpiece 12 and is immediately retracted upwardly. Then, the electrode 10 is again moved downwardly. During this operation, the gap between the electrode 10 and the workpiece 12 is greatly increased, as a result of which the machining solution pressure is decreased. Accordingly, the machining solution pressure decision circuit 42 outputs the "L" signal. Thus, in the short-circuiting condition, the inverter 46 outputs the "H" signal.

In the penetrating condition, the electrode 10 is moved downwardly and the gap is eliminated, and accordingly the machining solution pressure is decreased. Therefore, the machining solution pressure decision circuit 42 outputs the "L" signal. Thus, in the penetrating condition, the inverter 46 outputs the "H" signal.

The machining condition pressures and the output signals corresponding thereto in the various operating conditions are as described above. The output signal of the inverter 46 is at "L" in the machining condition, and at "H" in the short-circuiting or penetrating condition. Therefore, the machining condition and the penetrating condition can be readily distinguished from one another by this detection factor.

The output signal of the gap voltage variation pattern decision circuit 38 and the output signal of the inverter 46 are applied to an AND circuit 40. When both the output signals are at "H", the AND circuit 40 applies a stop signal to the power supply unit 16 to stop the machining operation.

In the idling condition, the output signal of the gap voltage variation pattern decision circuit 38 is at "H" whereas the inverter 46 provides no output signal. Therefore, the AND gate 40 provides no stop signal.

During machining, the output signal of the gap voltage variation pattern decision circuit 38 and the output signal of the inverter 46 are at "L". Therefore, the AND circuit 40 outputs no stop signal.

In the short-circuit condition, the output signal of the variation pattern decision circuit 38 is at "L" and the output signal of the inverter 46 is at "H". Therefore, the AND circuit 40 outputs no stop signal.

In the penetrating condition, since the output signal of the gap voltage variation pattern decision circuit 38 and the output signal of the inverter 46 are both at "H", the AND circuit 40 applies the stop signal to the power supply unit 16 so that the application of power is suspended, to thereby stop the machining operation.

In this embodiment, as before, the converter 36, the gap voltage variation pattern decision circuit 38, the machining solution pressure decision circuit 42, the inverter 46 and the AND gate 40 may be separate from the numerical control unit 32.

Closely related to the machining solution pressure is the flow speed or rate of the solution. Accordingly, this parameter may also be used as a detection factor, as more specifically explained hereafter.

Figure 13:
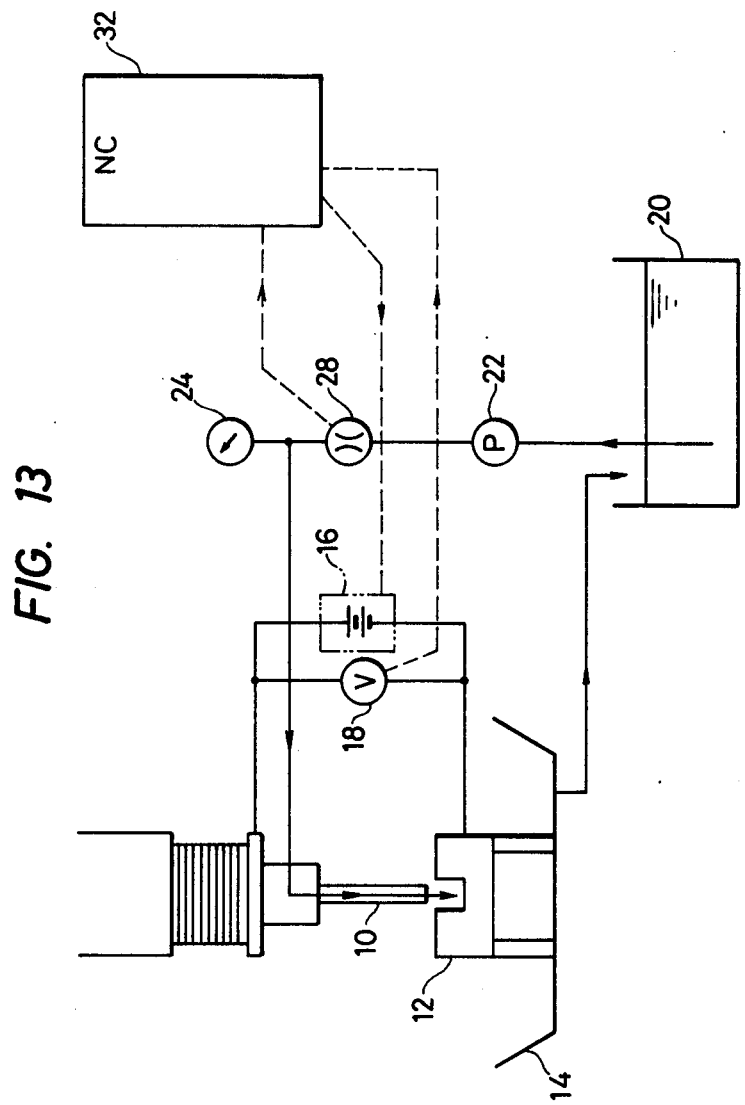
FIG. 13 shows the arrangement of a further embodiment of the invention.
Figure 15:
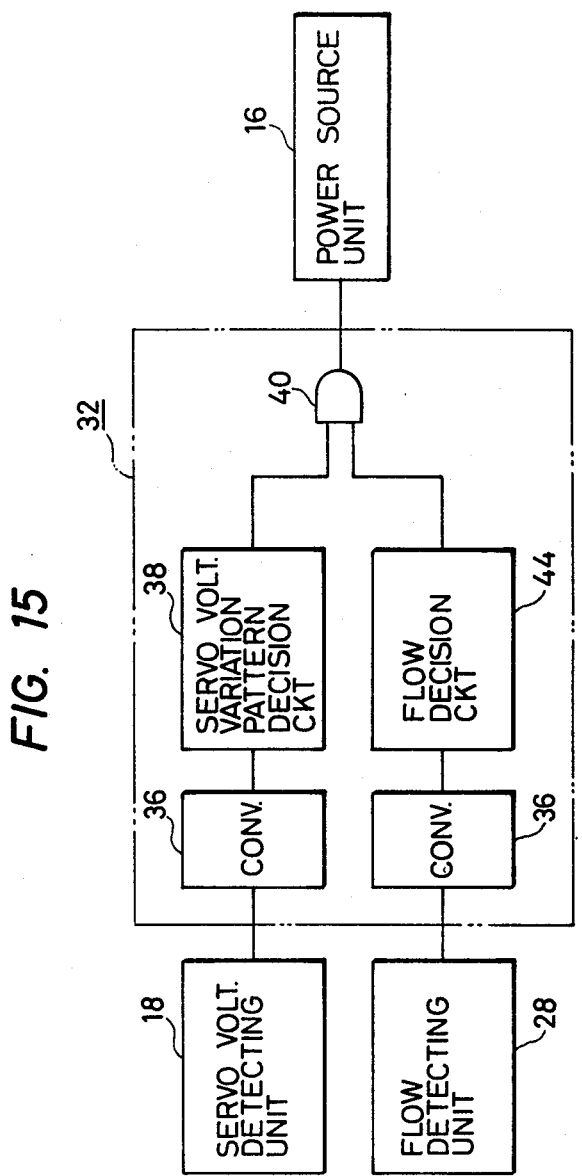
FIG. 15 illustrates a circuit used in the arrangement of FIG. 13.

In the present embodiment illustrated in FIGS. 13–15, the machining condition and the penetrating condition are descriminated from one other according to the above noted factor.

In order to electrically detect the machining solution flow, a machining solution flow detecting unit 28, a converter 36, and a machining solution flow decision circuit 44 are provided as shown in FIGS. 13 and 15.

The machining solution flow and the corresponding output signals in the various operating conditions are as indicated in FIG. 14. In this embodiment, the output signals "H" and "L" are provided according to high and low machining solution flows, respectively.

The machining solution flow detecting unit 28 detects the flow of the machining solution supplied. The flow thus detected is subjected to a predetermined conversion in the converter 36 and is then applied to the machining solution flow decision circuit 44, where the flow of the machining solution is determined. If the flow is at a set value, the circuit 42 outputs an "L" signal, and if it is higher than the set value, it outputs an "H" signal.

In the idling condition, the flow of the machining solution is being adjusted to the set value; that is, it is adjusted to the set flow before the start of machining. In the idling condition, therefore, the machining solution flow decision circuit 44 provides no output signal.

In the machining condition, the solution is supplied into the gap between the electrode 10 and the workpiece 12, the flow of the solution being equal to the set flow. Therefore, the machining solution flow decision circuit 44 maintains the "L" signal.

In a short-circuit condition, the electrode 10 is brought into contact with the workpiece 12 and is immediately retracted upwardly, and then later returned downwardly. During this operation, the gap between the electrode 10 and the workpiece 12 is greatly increased, as a result of which the machining solution flow is increased. Accordingly, the decision circuit 44 outputs the "H" signal.

In the penetrating condition, the electrode 10 is moved downwardly and the gap is eliminated, and accordingly the flow is increased. Therefore, the flow decision circuit 44 outputs the "H" signal.

As described above, the output signal of the machining solution flow decision circuit 44 is at "L" in the machining condition, and at "H" in the short-circuit or penetrating conditions. Therefore, the machining condition and the penetrating condition can readily be distinguished by this factor.

The output signal of the gap voltage variation pattern decision circuit 38 and that of the machining solution flow decision circuit 44 are applied to an AND circuit 40. Only when both the output signals are at "H", will the AND circuit 40 apply the stop signal to the power supply unit 16.

In the machining condition, the output signal of the circuit 38 and the output signal of the circuit 44 are both at "L". Therefore, the AND circuit 40 outputs no stop signal.

In the short-circuit condition, the output signal of the decision circuit 38 is at "L" while that of the circuit 44 is at "H". Therefore, the AND circuit 40 outputs no stop signal.

In the penetrating condition, since the output signal of the gap voltage variation pattern decision circuit 38 and the output signal of the circuit 44 are both at "H", and AND circuit 40 applies the stop signal to the power supply unit 16 to thereby stop the machining operation. As in prior embodiments, the converter 36, the circuit 38, the AND gate 40 and the circuit 44 may be provided individually from the numerical control unit 32.

Yet another factor which is distinct from the gap voltage variation pattern may be used therewith as an additional detection factor.

Figure 17:
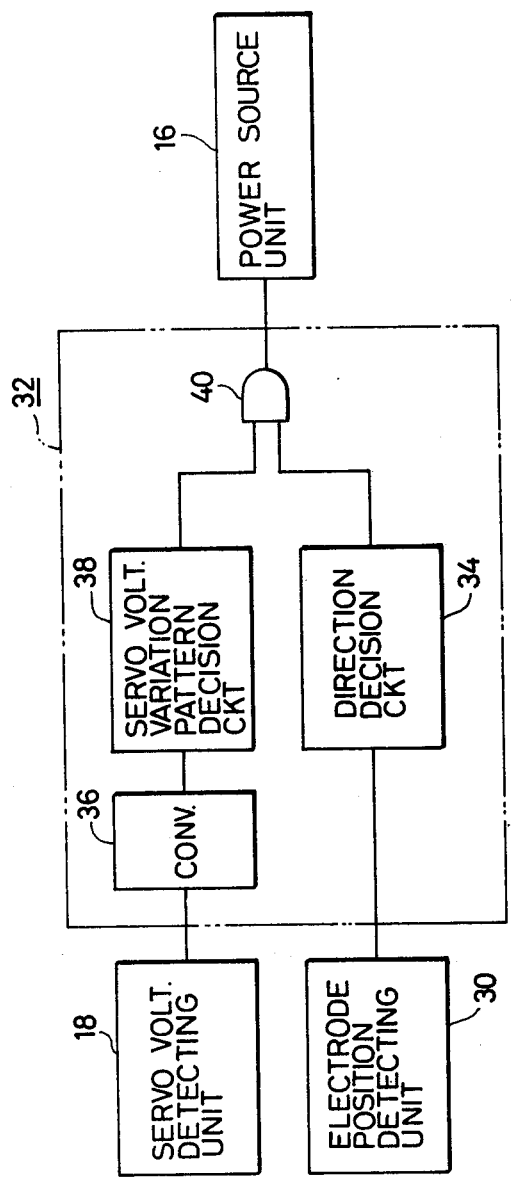
FIG. 17 illustrates a circuit for use with the embodiment of FIG. 16.

In particular, in the embodiment of FIGS. 16 and 17, the second factor for detecting the penetration of the electrode is the electrode movement direction. In order to electrically detect the electrode movement direction, the electrode position detecting unit 30 and an electrode movement direction decision circuit 34 are provided as shown in FIG. 17. The overall arrangement of the system is as shown in FIG. 5.

The electrode movement direction and the corresponding output signals in the various operating conditions are as indicated in FIG. 16.

In this embodiment, the two output signals "H" and "L" are provided according to the electrode movement direction (upward or downward), respectively.

In this embodiment, the electrode position is utilized to detect the electrode movement direction. The electrode position detecting unit 30 detects the position of the electrode 10 to output a position signal which is applied to the electrode movement direction decision circuit 34, where the position signal is processed to determine the electrode movement direction. Thus, the circuit 34 outputs the "H" signal when the electrode moves downward, and the "L" signal when it moves upward.

In the idling condition, the gap between the electrode 10 and the workpiece 12 is large, and therefore the electrode is moved downwardly. Thus, in the idling condition, the output signal is at "H".

During the machining operation, the electrode 10 is moved downwardly while performing machining. Thus, during the machining operation, the output signal is maintained at "H".

In the short-circuit condition, the electrode 10 comes in contact with the workpiece 12. In order to eliminate the short-circuit condition, the electrode is retracted upwardly. In this case, the output signal is at "L". Thereafter, the electrode 10 is moved downwardly again. During the downward movement, the output signal is at "H".

In the penetrating condition, the electrode 10 penetrates the workpiece and is further moved downwardly. Thus, in the penetrating condition, the output signal is maintained at "H".

In the upward movement of the electrode 10 for eliminating the short-circuit condition, the output signal is at "L" because of the upward movement whereas in the penetrating condition, the output signal is at "H" similarly as in the downward movement of the idling, machining and short-circuit conditions. Thus, the penetrating condition can be readily distinguished from the upward movement of the electrode 10 for eliminating the short-circuit condition.

The output signal of the gap voltage variation pattern decision circuit 38 and the output signal of the electrode movement direction decision circuit 34 are applied to an AND circuit 40. When both output signals are at "H", the circuit 40 applies a stop signal to the power supply unit 16.

In the idling condition, the output signal of the gap voltage variation decision circuit 38 and the output signal of the electrode movement direction decision circuit 34 are at "H". However, the present electric discharge machining apparatus is so set that, as noted in previous embodiments, in the idling condition, the AND gate 40 will provide no stop signal to the power supply unit 16.

In the machining operation, the output signal of the circuit 38 is at "L" and the output signal of the direction decision circuit 34 is at "H". Therefore, the AND circuit 40 outputs no stop signal.

In the short-circuit condition, the output signal of the circuit 38 is at "L", while the output signal of the direction decision circuit 34 is at either "L" or "H". In either case, the AND circuit 40 outputs no stop signal.

In the penetrating condition, since the output signal of the gap voltage variation pattern decision circuit 34 and the output signal of the electrode movement direction decision circuit 34 are both at "H", the AND circuit 40 applies the stop signal to the power supply unit 16 so that the application of power is suspended. The circuits 34, 36, 38 and 40 may of course be separated from the numerical control unit 32, if desired.

Of the foregoing embodiments, each has employed gap voltage variation pattern detection as the primary detection factor, and in several embodiments, this factor has been combined with a secondary detection factor in order to increase the reliability of electrode penetration detection. Within the realm of the invention, it is possible to combine the several detection parameters discussed above into a single control unit. In particular, in FIGS. 18 through 20 is disclosed one example of a device which employs the several detection factors noted above simultaneously in order to detect electrode penetration.

Figure 18:
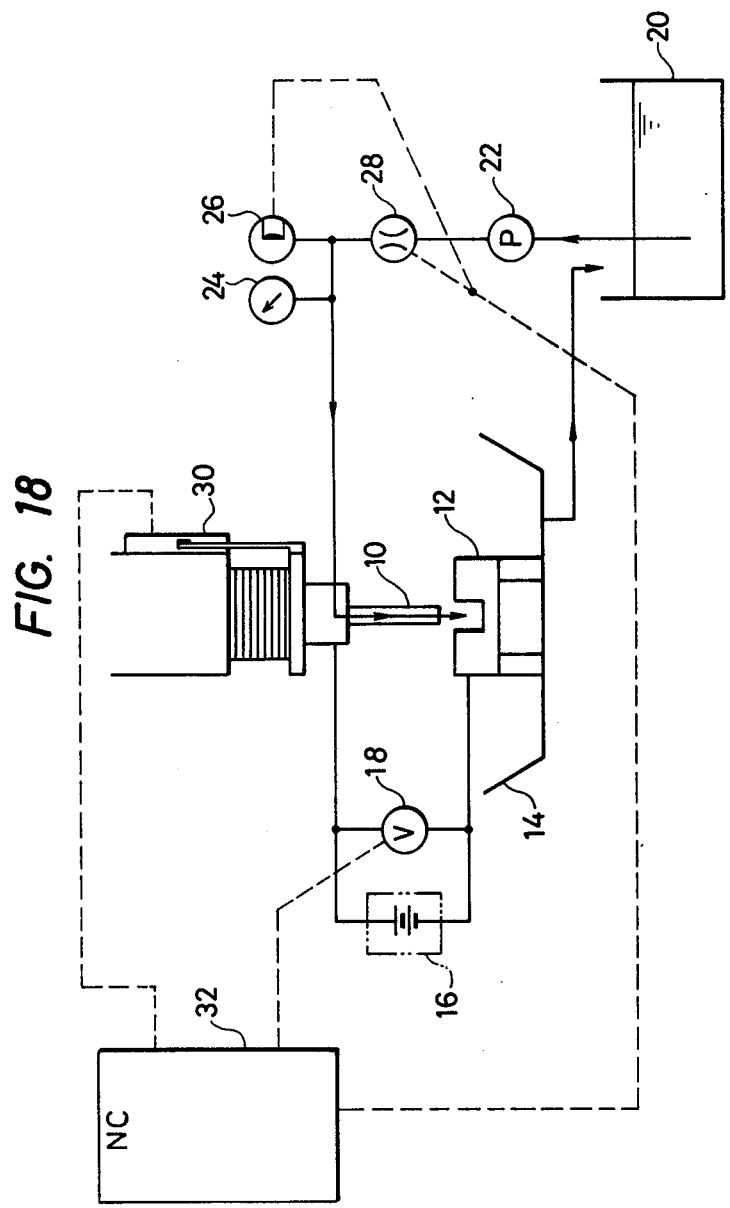
FIG. 18 illustrates the arrangement of a combined form of the invention, employing the combination of parameters used in the preceding embodiments.

FIG. 18 illustrates the basic arrangement of the device, which, as will be noted, represents a combination of the several arrangements previously described. In FIG. 19 is contained the various output signals derived via the several detection components for the four operating stages or conditions of the device.

Figure 20:
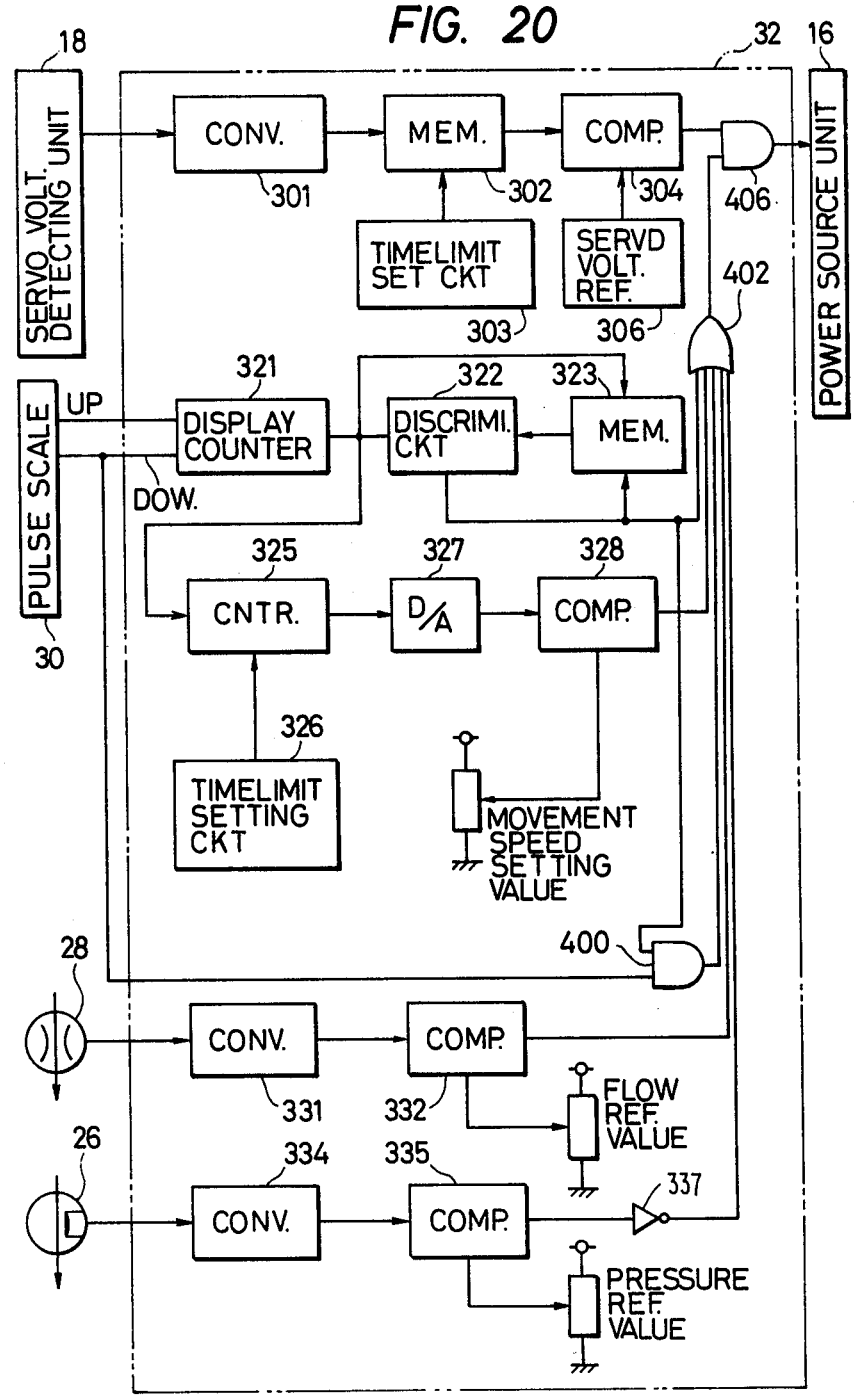
FIG. 20 is a circuit diagram for use with the embodiment of FIG. 18.

In FIG. 20 is illustrated a circuit for use with the arrangement of FIG. 18. In this device, the gap voltage detecting unit 18 detects the average voltage across the gap, which are then subjected to conversion in the converter 301 and stored in a memory circuit 302. The pattern stored in the memory 302 is variable in duration, by means of a timing limit circuit 303. The pattern stored in the memory 302 is compared in a comparator circuit 304 with stored patterns contained in a gap voltage reference circuit 306.

In the idling condition, the servo voltage variation pattern will be at +6 V, and the comparison of this pattern in the circuit 304 with the patterns stored in the circuit 306 will produce an "H" signal. However, when machining begins, the voltage variation pattern will contain a change from +6 V to −3 V−+3 V. When this pattern is compared in the circuit 304 with the patterns stored in the reference circuit 306, the output signal level will be changed from "H" to "L". During machining, the voltage will be between +3 V and −3 V, and the "L" output signal will be maintained.

During a short-circuit, the voltage variation pattern will exhibit a change from the normal machining voltage to −6 V until the electrode is moved away from the workpiece, whereupon the voltage will be changed from −6 V to +6 V. When this patterncontained in the memory is compared with the pattern stored in the reference circuit 306, the "L" signal is outputted. During any further machining the output is maintained at "L" as discussed above, but when the gap voltage variation pattern changes from +3 V to −3 V up to +6 V, the comparison circuit will raise the output to "H". This latter variation pattern is indicative of electrode penetration. Accordingly, the high level signal is applied to an AND gate 406, the other input thereto being derived from the output of an OR circuit 402. As discussed previously, the circuit of FIG. 20 is designed so that the high level output generated during the idling state will not cause an erroneous penetrating detection.

The present position of the electrode is detected by a pulse scale 30 which operates to produce an up-down signal. This signal is processed by a display counter 321 to display the present position. The content of the counter 321, which may represent the thus far deepest machining position, is stored in a memory 323. Thereafter, this stored value is successively compared with the output of the counter 321 in a comparator 322 to reset the greatest machining depth position. In this case, if the signal representative of the present position is higher than the stored value, the data stored in the memory 323 is replaced by the present position signal, and the comparator 322 outputs an "H" level signal to the OR gate 402.

The value stored in the display counter 321 is shifted at predetermined intervals of time to a counter 325, the noted time interval being adjustable by means of a time setting circuit 326. The content of the counter 325 is then subjected to digital to analog conversion in the D/A converter 327. The resultant signal is then supplied to a comparator 328 where the signal is compared with a predetermined electrode movement speed value. Where the signal is larger than the predetermined value, the comparator 328 produces a high level signal, which is applied to the AND gate 406 via the OR gate 402.

The machining solution flow is measured by the flow measuring device 28. The output signal representing the measured flow is converted as necessary by a converter 331. The converted signal is then compared with the reference value in the comparator 332. Where the flow signal is larger than the reference value, the comparator 332 will produce a high level signal which is applied to the OR gate 402, and thence to the AND gate 406. The machining solution pressure is detected in substantially the same manner as the flow, the pressure being measured by a pressure meter 26. The pressure signal is converted as desired in a converter 334 to be compared with the reference signal in a comparator 335. When the pressure signal is smaller than the reference signal, the comparator 335 will produce a low level signal. In this case, a high level signal will be applied to the OR circuit 402, due to the inverter 337 which follows the comparator 335.

Finally, the final input to the OR circuit 402 may be derived directly from the pulse scale 30. In this instance, the "down" signal from the pulse scale is supplied directly to the OR gate 402, to indicate the downward movement of the electrode.

In the embodiment just discussed, the gap voltage variation pattern is used as the primary detection factor, but this factor alone will not trigger the AND gate 406 to halt the machining process. Rather, the suspension of electric current is also dependent upon the concurrent detection of at least one of the subsidary factors discussed above.

Also, and as shown in FIG. 20, the "down" output of pulse unit 30 may be applied as one input of an AND gate 400, the other input of which is coupled to the output of the machining depth determining circuit 322. Though not strictly necessary, this additional AND gate serves to positively prevent an erroneous stop signal from being generated during the electrode return phase of the short-circuit condition, when the electrode direction signal is at "H".

The electric discharge machining apparatus according to the present invention can be used to cut workpieces and form holes in workpieces into which the wire-shaped electrode has been inserted.

As described above, in the electric discharge machining apparatus of the invention, the time instant when the end of the electrode 10 penetrates the workpiece 12 is detected from the servo voltage variation pattern, alone or in combination witn other factors, so that the machining operation is automatically ended. Therefore, the electric discharge machining conditions are stable and optimum at all times, and the configuration of a hole formed by the machining apparatus is of high accuracy. Furthermore, it is unnecessary for the operator to carry out the aforementioned troublesome operation involving watching the position of the electrode 10 relative to the workpiece 12 so as to visually detect when the electrode 10 penetrates the workpiece 12, thus contributing to an improvement in work efficiency, to the economical use of the electric discharge machining apparatus and to the realization of a fully automatic electric discharge machining apparatus.

What is claimed is:

1. An electric discharge machining apparatus, comprising: gap voltage detecting means for detecting a gap voltage variation pattern applied to a power supply unit adapted to apply a predetermined voltage across an electrode and a workpiece of said apparatus, means for storing voltage variation patterns corresponding to transitions between known machining conditions and voltage variation pattern comparing means for comparing said gap voltage variation patterns from said detecting means with said prestored voltage variation patterns, a time instant when said electrode penetrates said workpiece being detected from at least said gap voltage variation patterns when a gap voltage variation pattern matches a prestored voltage variation corresponding to electrode penetration, and circuit means for ending a machining process in response to said detection of electrode penetration.

2. An electric discharge machining apparatus as claimed in claim 1, wherein, upon detecting a voltage variation pattern characteristic of electrode penetration, said voltage variation pattern comparing means outputs a stop signal, and power supply control means for receiving said stop signal and ending said machining process in response thereto.

3. An electric discharge machining apparatus as claimed in claim 1, further comprising secondary detection means cooperating with said voltage variation pattern comparing means, electrode penetration being detected from the outputs of both said secondary detection means and said voltage variation pattern comparing means.

4. An electric discharge machining apparatus as claimed in claim 3, said secondary detection means comprising an electrode position detecting device for detecting the position of said electrode during said machining process, a machining depth decision circuit for processing a position signal produced by said position detector to detect whether a given machining operation represents that of the thus far largest machining depth, said electrode penetration being detected from the combination of the outputs of the voltage variation pattern comparing means and said depth decision circuit.

5. An electric discharge machining apparatus as claimed in claim 3, said secondary detection means comprising an electrode position detecting device for detecting the position of said electrode during machining; and an electrode movement speed decision circuit for processing an output signal of said electrode position detecting device to thereby detect the movement speed of said electrode, the time of electrode penetration being detected from both said gap voltage variation pattern and said electrode movement speed.

6. An electric discharge machining apparatus as claimed in claim 3, said secondary detection means comprising a machining solution pressure detecting device for detecting the pressure of machining solution supplied by a machining solution circulating device; and a pressure decision circuit for determining the pressure of the machining solution during machining, the time of electrode penetration being detected from both said gap voltage pattern and said machining solution pressure.

7. An electric discharge machining apparatus as claimed in claim 3, said secondary detection means comprising a machining solution flow detecting device for detecting the flow of machining solution supplied by a machining solution circulating device; and a flow decision circuit for determining the magnitude of the flow during the machining operation, the time of electrode penetration being detected from both said gap voltage variation pattern and the said machining solution flow.

8. An electric discharge machining apparatus as claimed in claim 3, said secondary detection means comprising an electrode position detecting device for detecting the position of said electrode during machining; and electrode movement direction decision means for processing a signal produced by said electrode position detecting device to thereby detect the direction of movement of said electrode during the maching operation, the time instant of electrode penetration being detected from both the gap voltage variation pattern and the electrode movement direction.

9. An electric discharge machining apparatus as claimed in claim 3, said secondary detection means comprising electrode speed detecting means, electrode direction detecting means, machining depth detection means, machining solution flow detecting means and machining solution pressure detecting means, each of said second detection means being associated with decision circuit means, first gate means for receiving the outputs of said several decision circuit means, and second gate means receiving as a first input the output of said first gate means, and as a second input, the output of said voltage variation pattern comparing means.

10. An electric discharge machining apparatus as claimed in claim 3, wherein said means for ending said machining process comprises gate means receiving as one input the output of said voltage variation pattern comparing means, and as a second input, the output of said secondary detection means, said gate means generating a stop signal, and power supply control means for receiving said stop signal.

* * * * *